Sept. 22, 1970 D. J. NELSON 3,529,614

FLUID LOGIC COMPONENTS

Filed Jan. 3, 1968

INVENTOR.
DESMOND J. NELSON
BY Harry A. Herbert Jr and
Jacob N. Erlich
ATTORNEYS United States Patent Office 3,529,614

Patented Sept. 22, 1970

3,529,614

FLUID LOGIC COMPONENTS

Desmond J. Nelson, Gardena, Calif., assignor to the United States of America as represented by the Secretary of the Air Force Filed Jan. 3, 1968, Ser. No. 695,385
Int. Cl. F15c 1/10
U.S. Cl. 137—81.5 4 Claims

ABSTRACT OF THE DISCLOSURE

A fluid logic component having a fluid interaction chamber, a main fluid power nozzle for issuing a well-defined stream into one end of the chamber, a pair of output passages having entrances located downstream of the main nozzle, the entrances defining the other end of the chamber, at least one fluid control passage entering one side of the chamber and a fluid bias passage entering the other side of the chamber. There are at least two fluid signal passages entering a vortex chamber which is operably associated with at least one power input passage and the control passage. By means of the above arrangement of fluid signal or lack of a fluid signal regulates through which output passage the stream issuing from the main nozzle will exit.

BACKGROUND OF THE INVENTION

This invention relates generally to fluid logic devices, and more particularly to pure fluid logic components capable of performing logic functions without moving parts.

Existing electronic logic systems are capable of performing the basic arithmetic functions of addition, subtraction, multiplication and division. The electronic systems typically include circuits that are capable of producing an output signal which is a prescribed function of one or more input signals. Such systems normally employ the binary system of number notation because of the ease of recognition and handling of the quantities employed. Specifically, the binary number system utilizes only two number designations 1 and 0; the 1 normally being represented by a voltage pulse and the 0 normally being represented by the absence of a voltage. By causing the voltage pulse representing a binary 1 to be substantially greater (for instance, 2 volts) than the quiescent voltage level of the system, which represents a binary 0, the circuits of the system may be made to readily distinguish between the two signals generated in the system.

Electronic logic components capable of performing the basic arithmetic functions of addition, subtraction, multiplication and division are conventional in the computer art. Such networks typically include "AND" and "OR" components which, when properly combined, accomplish the desired logic function of the counter or computer.

The present invention is primarily concerned with the "AND" and "OR" functions of logic elements. In electronic binary systems an "AND" function signifies a type of circuit whereby the output signal has a value of 1 only when input data signals are applied to all of the input circuits of the element.

An "OR" component serves to indicate that the output value is 1 if any or all of the input data signals have a value of 1.

Electronic computers can, of course, speedily perform all types of logic functions. However, in many applications of data handling, high speeds of operation are not required and therefore the high cost of an electronic system is not warranted. Furthermore, many systems under electronic logic control are severely limited by the inability of the transistors to operate in intensely radiated and/or thermal fields.

While mechanical systems employing liquids and gases have been developed which will perform logic functions essentially analogous to those performed by existing electronic logic elements, such systems require large numbers of moving parts. Moving mechanical parts produce operating limitations because of friction, thermal expansion and wear. Also, mechanical systems are limited in some applications because the weight and inertia of the moving parts impart inherently long response times to such systems and consequently reduce the computing speed below that desired even for relatively low speed systems.

In joining logic components to provide adders, subtractors, multipliers and dividers in any kind of a computer, it is often necessary to stack and otherwise combine the various logic components. When the signal passes through a series of such components, however, there are power losses, causing the amplitude of the output signal to decrease. Thus, in an electronic computer, voltage and current amplification is required in order to perform complex operations.

Similarly, in fluid systems, energy losses resulting from skin effects and stream turbulence reduce the magnitude of the output signal and therefore some mechanism for providing a signal gain should preferably be incorporated in the system. Achieving a power gain in a fluid computer has hitherto required moving parts, however, as mentioned above, such parts cause these computers to have relatively slow response times. Thus, there existed a need in the fluid computer art for achieving a signal or power gain without moving parts so that the fluid computer elements may be stacked into complex arrangements and combinations and yet operate with relatively fast response times.

It was discovered recently that a fluid-operated system having no moving parts could be constructed so as to provide a fluid amplifier in which the proportion of the total energy of a fluid stream delivered to an output orifice or utilization device is controlled by a further fluid stream of lesser total energy. These systems are generally referred to as "pure fluid amplifiers," since no moving mechanical parts are required for their operation.

A typical pure fluid amplifier may comprise a main fluid nozzle extending through an end wall of an interaction region defined by a sandwich-type structure consisting of an upper plate and a lower plate which serve to confine fluid flow to a planar flow pattern between the two plates, an end wall, two side walls (hereinafter referred to as the left and right side walls), and one or more dividers disposed at a predetermined distance from the end wall. The leading edges or surfaces of the dividers are disposed relative to the main fluid nozzle centerline so as to define separate areas in a target plane. The side walls of the dividers in conjunction with the interaction region side walls establish the receiving apertures which are entrances to the amplifier output channels. Completing the description of the apparatus, left and right control orifices may extend through the left and right side walls, respectively. In the complete unit, the region bounded by top and bottom plates, side walls, the end wall, receiving apertures, dividers, control orifices and a main fluid nozzle is termed an "interaction chamber region."

SUMMARY OF THE INVENTION

The pure fluid amplifiers or logic components of the instant invention control the delivery of energy of the main stream of fluid to an outlet orifice or utilization device by means of a secondary or control stream of fluid which is regulated by a fluid input signal flowing into a vortex chamber. It has been found that by means of this vortex chamber the logic components of the instant invention have an improved multi-input capability.

The pure fluid amplifiers or logic components of the instant invention subsequently described may employ air or another gas or water or another liquid as the working fluid. If desired, solid particles may be entrained in the working fluid. The amplifiers may be constructed of plastic, metal, ceramic or other material. For ease of illustration they are shown in the accompanying drawing as being made of a clear plastic material.

The amplifiers may comprise three flat plates. The desired channel or chamber configuration is cut, etched, stamped or otherwise formed in one of the plates. This plate is then covered on each side with the other two plates and the plates screwed or otherwise bonded together to form a substantially solid body. The body is then bored and tapped so that pipes may be attached to apply signals to and convey signals from the amplifier. This construction is well known in the art, hence the accompanying drawing shows only the channel or chamber configurations which define the paths of fluid flow which form an essential part of the instant invention.

It is, therefore, an object of this invention to provide pure fluid logic components with multi-input capability.

It is another object of this invention to provide pure fluid logic components which have no moving parts.

It is still another object of this invention to provide pure fluid logic components with the ability to perform logic functions in intensely raidated and/or thermal fields.

It is a further object of this invention to provide pure fluid logic components which are economical to produce and which utilize conventional, currently available components that lend themselves to standard mass production manufacturing techniques.

For a better understanding of the present invention together with other and further objects thereof, reference is had to the following description taken in connection with the accompanying drawing and its scope will be pointed out in the appended claims.

DESCRIPTION OF THE INVENTION

Figures 1, 2:
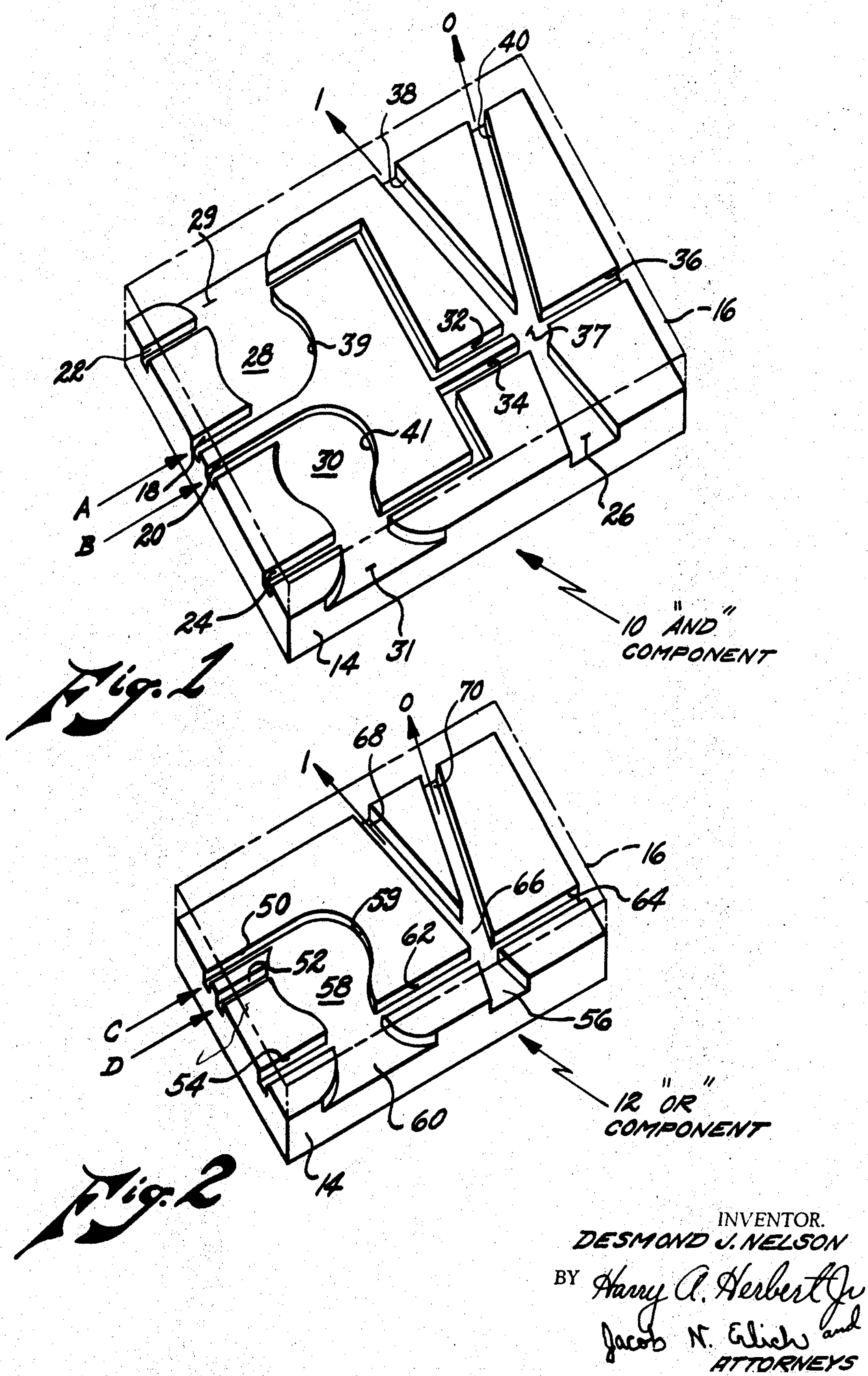
FIG. 1 represents an isometric view of the "AND" pure fluid component of this invention.
FIG. 2 represents an isometric view of the "OR" pure fluid component of this invention.

Referring now to FIGS. 1 and 2 of the accompanying drawing for a more complete understanding of the invention, there is illustrated the "AND" and "OR" pure fluid logic components 10 and 12, respectively, which make up the instant invention. Both components 10 and 12 are formed in a flat plate 14 by molding, casting, etching or other conventional cavity and passage forming techniques. The plate 14 is covered by a flat plate 16, the plates 14 and 16 being secured one onto the other by machine screws, clamps or adhesives. For purposes of more clearly illustrating the invention, the plates 14 and 16 are shown composed of a clear plastic material or glass, although it should be understood that the plates 14 and 16 may be composed of any material such as metal or ceramic that is compatible with the fluid or fluids employed.

Referring more specifically to FIG. 1 which illustrates the "AND" gate pure fluid logic component of this invention, the plate 14 is cut, molded or otherwise formed in the configuration shown in FIG. 1. As can be seen in FIG. 1, the "AND" component 10 has a fluid interaction chamber 37 for confining the fluid flow therein to planar flow. A main fluid power nozzle 26 issues a well-defined stream into one end of the chamber 37. Left and right output passages 38 and 40, respectively, have entrances located downstream of the main nozzle 26 for receiving the stream therefrom, the entrances defining the other end of chamber 37. The left and right output passages 38 and 40 may also be regarded as the 1 value output passage and 0 value output passage, respectively. Two fluid control passages 32 and 34 enter one side of chamber 37 and the fluid stream issuing therefrom is used to deflect the stream from main nozzle 26 into the right output passage 40. Although two control passages are shown, it should be realized that any number may be used. A fluid bias passage 36 enters the other side of chamber 37 and the fluid stream issuing therefrom under the proper conditions, hereinafter described, deflects the stream from main nozzle 26 into the left output passage 38. Two fluid power side input passages 22 and 24 emit a stream which flows into control passages 32 and 34, respectively. Operably associated with the power input passages 22 and 24 are two vortex chambers 28 and 30. There are two fluid signal input passages 18 and 20 directly connected to the two vortex chambers 28 and 30 having exhaust passages 29 and 31, respectively, so that the fluid signal or lack of fluid signal emanating from pasasges 18 and 20 regulates through which output passage the stream which emanates from the main nozzle 26 exits. Although there are only two input signal passages and vortex chambers shown, any number may be used.

A and B are two fluid signals arriving at the "AND" component 10. As hereinbefore explained in the "AND" component the output is in the high state or has a 1 value only when *all* the input signals are in a high pressure state, that is a fluid stream is flowing simultaneously through both passages 18 and 20.

A power supply constantly forces a high pressure fluid stream through side input passages 22, 24 and main nozzle 26 while a low pressure fluid stream is forced through bias passage 36. Therefore, under the condition when no signal or fluid stream comes through input passages 18 and 20 the power inputs from side power input passages 22 and 24 flow directly to control passages 32 and 34. The fluid stream emanating from control passages 32 and 34 is of sufficient pressure to overcome the pressure of the fluid stream emanating from bias passage 36. The fluid stream through main fluid nozzle 26 is therefore deflected through right output passage 40 setting up a 0 value in the "AND" component.

By putting a fluid signal such as A through input passage 18, for example, the fluid now enters vortex chamber 28. In accordance with this invention the vortex chambers 28 and 30 are of a substantially circular configuration having input passages 18 and 20, respectively, entering the top portion of chambers 28 and 30 and the chambers further have outer side walls 39 and 41 and exhaust passages 29 and 31, respectively. A fluid stream entering passages 22 and 24 is not affected by the vortex chambers 28 and 30 when there is no fluid input signals, however, when there is a fluid input signal entering passages 18 and 20 it flows directly into the chambers 28 and 30 and flows against outer walls 39 and 41 and exits through exhaust passages 29 and 31, carrying along therewith any other fluid stream (such as the power streams from passage 22 and 24) in its path.

Referring again to the above example in which the fluid stream enters only input passage 18 of "AND" component 10, it can readily be seen that the fluid stream flows into vortex chamber 28 and passes along outer wall 39. During the above fluid flow the power flow from passage 22 is carried along with the stream from input passage 18 and exits through exhaust passage 29. Thus, due to the vortex configuration and the fluid stream from passage 18 no appreciable stream is emitted from control passage 32.

In the case of the "AND" component 10, it is necessary for *all* the input signals to be in a high pressure state before a 1 value is registered. In other words, in the above example since there is no fluid signal B entering passage 20 there is still a control stream emanating from control passage 34. This fluid stream from passage 34 is of sufficient pressure to overcome the low pressure stream from fluid bias passage 36 and therefore the fluid stream from main nozzle 26 is still deflected toward right output passage 40 which may be regarded as the 0 value output passage.

If both fluid signals A and B are applied it can be readily seen that appreciably no fluid stream will emanate from control passages 32 and 34. In this condition the stream through bias passage 36 is able to deflect the fluid stream from main nozzle 26 out the left output passage 38, thus setting up a 1 value in the "AND" component 10.

It should be realized that although the "AND" component 10 shown in FIG. 1 uses only two input signals and vortex chambers, it is capable of adapting to any reasonable number of input signals.

Referring now to FIG. 2, which represents the "OR" pure fluid logic component of this invention, the plate 14 is cut, molded or otherwise formed in the following configuration.

The "OR" components 12 has a fluid interaction chamber 66 for confining the fluid flow therein to planar flow. A main fluid power nozzle 56 issues a well-defined stream into one end of the chamber 66. Left and right output passages 68 and 70, respectively, which may be regarded as the 1 value and 0 value output passages, respectively, have entrances located downstream of the main nozzle 56 for receiving the stream therefrom, the entrances defining the other end of chamber 66. A fluid control passage 62 enters one side of chamber 66 and the fluid stream issuing therefrom is used to deflect the stream from main nozzle 56 into the right output passage 70. Again, it should be realized under certain conditions more than one control passage may be used. A fluid bias passage 64 enters the other side of chamber 66 and the fluid stream issuing therefrom under the proper conditions, hereinafter described, deflects the stream from main nozzle 56 into the left output passage 68. There is a fluid power side input passage 54 emitting a stream of fluid into control passage 62. Operably associated with the power input passage 54 is a vortex chamber 58. There are two fluid signal input passages 50 and 52 directly connected to the vortex chamber 58 which has a exhaust passage 60 associated therewith, so that the fluid signal or lack of fluid signal emanating from passages 50 and 52 regulates through which output passage the stream which emanates from the main nozzle 56 exits. It should be realized that although only two input signals are shown, any reasonable number may be used.

C and D are two fluid signals arriving at the "OR" component 12. As hereinabove described in the "OR" component the output is in the high state or has a 1 value if *any* or *all* of the input signals are in the high pressure state.

A power supply constantly forces a high pressure stream through side input passage 54 and main nozzle 56, while a low pressure stream is forced through bias passage 64. Therefore, under the condition when no signal or fluid stream comes through input passages 50 and 52, the fluid power input stream from side power input passage 54 flows directly into control passage 62. The pressure of the fluid stream emanating from control passage 62 is of sufficient strength to overcome the pressure of the stream emanating from bias passage 64. The stream through main fluid nozzle 56 is therefore deflected through right output passage 70 setting up a 0 value in the "OR" component.

By putting a fluid signal such as C through input passage 50, for example, the stream now enters vortex chamber 58. In accordance with this invention the vortex chamber 58 is of a substantially circular configuration having input passages 50 and 52 entering the top portion of chamber 58. Chamber 58 further comprises an outer wall 59 and an exhaust passage 60. A fluid stream entering passage 54 is not affected by the chamber 58 when there is no fluid input signals; however, when there is a fluid stream entering passages 50 and 52 the stream flows directly into chamber 58, flows against outer wall 59 and exits through exhaust passage 60, carrying along therewith any fluid stream in its path. The "OR" component 12 is not limited to merely two input passages 50 and 52 but because of the shape of the vortex chamber any number of input passages may be used.

Referring again to the above example in which the fluid stream enters only input passage 50 (signal C) of the "OR" component 12, it can be readily seen that the fluid stream flows into vortex chamber 58 and passes along the outer wall 59. During the above fluid stream flow the power stream from passage 54 is carried along with the stream from input passage 50 and exits through exhaust passage 60. Thus, due to the vortex chamber configuration and the fluid stream from passage 50 no appreciable fluid stream emerges from control passage 62. In this condition the fluid pressure through bias passage 64 is able to deflect the fluid stream from main nozzle 56 out the left output passage 68, thus setting up a 1 value in the "OR" component 12.

MODE OF OPERATION

The "AND" component 10, shown in FIG. 1, has three operating conditions: (1) wherein there are no fluid input signals; (2) wherein there is only one fluid input signal (A or B) and (3) wherein there are two fluid input signals (A and B).

(1) When there are no fluid input signals, the "AND" component 10, as hereinbefore described, has an output value of 0. The power fluid stream which enters passages 22 and 24 flows directly to control passages 32 and 34, respectively, the stream emanating from passages 32 and 34 deflects the power fluid stream from nozzle 26 into the right hand output passage 40 which may be regarded as the 0 value output passage.

(2) When there is only one input signal (A or B), the "AND" component 10, as hereinbefore described, has an output value of 0. The fluid input signal enters either passages 18 or 20, flows into either vortex chamber 28 or 30, flows against either outer walls 39 or 41, and as it exits from either exhaust passages 29 or 31, it carries with it the power fluid stream from either passage 22 or 24. In this condition, it can be seen that one control passage, either passage 32 or 34, will still have a fluid stream emanating therefrom. The pressure of this fluid stream will be great enough to overcome the pressure from the fluid stream from bias passage 36 and therefore will deflect the power fluid stream from main nozzle 26 into the right hand output passage 40 which may also be regarded as the 0 value output passage.

(3) When there are two fluid input signals (A and B), the "AND" component 10, as hereinbefore described, has an output value of 1. The fluid signals enter both passages 18 and 20, flow into both vortex chambers 28 and 30, flow against both outside walls 39 and 41, and the streams carry along with them the power fluid streams from passages 22 and 24 while exiting through exhaust passages 29 and 31. In this condition, it can be seen that substantially no fluid stream will emanate from control passages 32 and 34, thus allowing the fluid stream from bias passage 36 to deflect the power fluid stream from main nozzle 26 out the left output passage 38 which may be regarded as the 1 value output passage.

The "OR" component 12, shown in FIG. 1, also has three operating conditions: (1) wherein there are no fluid input signals; (2) wherein there is only one fluid input signal (C or D) and (3) wherein there are two fluid input signals (C and D).

(1) When there are no fluid input signals, the "OR" component 12, as hereinbefore described, has an output value of 0. The power fluid stream enters passageway 54 and flows directly into control passage 62. The stream emanating from passage 62 is of sufficient pressure to overcome the pressure of the fluid stream from bias passage 64, thus deflecting the power fluid stream from main nozzle 56 into right output passage 70 which may be regarded as the 0 output passage.

(2) When there is only one fluid input signal, the "OR" component 12, as hereinbefore described, has an output value of 1. The fluid input signal enters either input passage 50 or 52, flows into vortex chamber 58, flows against outside wall 59 and carries with it the power fluid stream from passage 54, exiting through exhaust passage 60. Under this condition, it can be seen that substantially no fluid stream will emanate from control passage 62 and therefore the pressure from the fluid stream from bias passage 64 will be sufficient to deflect the power fluid stream from main nozzle 56 to the left output passage 68 which may be regarded as the 1 value output passage.

(3) When there are two fluid input signals, the "OR" component 12, as hereinbefore described, has an output value of 1. A fluid input signal enters both passages 50 and 52, flows into vortex chamber 58, flows against outside wall 59, and carries with it the stream from power input passage 54, exiting through exhaust passage 60. Again, under this condition, substantially no fluid stream will emanate from control passage 62. Therefore, the pressure of the fluid stream from bias passage 64 is sufficient to deflect the power fluid stream from main nozzle 56 to the left output passage 68 which may be regarded as the 1 value output passage.

I claim:

1. A fluid logic component comprising a fluid interaction chamber for confining fluid flow therein to planar flow, a main fluid power nozzle for issuing a well-defined stream into one end of said chamber, a pair of output passages having entrances thereof located downstream of said main nozzle for receiving the stream therefrom, said entrances defining the other end of said chamber, at least one fluid control passage entering one side of said chamber for deflecting the stream from said main nozzle into one of said output passages, a fluid bias passage entering the other side of said chamber for deflecting the stream from said main nozzle into the other of said output passages, at least one fluid power side input passage for directing a stream into said fluid control passage, at least one vortex chamber having an exhaust passage, said vortex chamber located between said fluid control passage and said power side input passage with said exhaust passage being in the same plane as and substantially perpendicular to said fluid control passage and at least one fluid input passage directly connected to said vortex chamber whereby a fluid signal or the lack of a fluid signal in said fluid input passage regulates through which output passage the stream issuing from said main nozzle exits.

2. A fluid logic component as defined in claim 1, wherein there are two fluid control passages, two vortex chambers, two fluid power side input passages, and two fluid input passages, one of said fluid input passages being directly connected to one of said vortex chambers and the other of said fluid input passages being directly connected to the other of said vortex chambers, and wherein one of said vortex chambers is located between one of said fluid power side input passages and one of said fluid control passages, and the other of said vortex chambers is located between the other of said fluid power side input passages and the other of said fluid control passages.

3. A fluid logic component as defined in claim 1, wherein said vortex chamber is of a circular configuration and has an exhaust passageway at one end thereof.

4. A fluid logic component as defined in claim 3, wherein said fluid signal passage enters the other end of said vortex chamber.

References Cited

UNITED STATES PATENTS

| | | | |
|---|---|---|---|
| 3,216,439 | 11/1965 | Manion | 137—81.5 |
| 3,326,227 | 6/1967 | Mitchell | 137—81.5 |
| 3,331,382 | 7/1967 | Horton | 137—81.5 |
| 3,368,577 | 2/1968 | Otsop | 137—81.5 |
| 3,410,291 | 11/1968 | Boothe et al. | 137—81.5 |
| 3,415,263 | 12/1968 | Warren et al. | 137—81.5 |

SAMUEL SCOTT, Primary Examiner